(12) United States Patent
Bhatt et al.

(10) Patent No.: US 7,801,833 B2
(45) Date of Patent: Sep. 21, 2010

(54) ITEM IDENTIFICATION CONTROL METHOD

(75) Inventors: Ashwinkumar Bhatt, Endicott, NY (US); Michael Hills, Endicott, NY (US); James J. McNamara, Jr., Vestal, NY (US); Candido Tiberia, Endicott, NY (US)

(73) Assignee: Endicott Interconnect Technologies, Inc., Endicott, NY (US)

( * ) Notice: Subject to any disclaimer, the term of this patent is extended or adjusted under 35 U.S.C. 154(b) by 934 days.

(21) Appl. No.: 10/740,500

(22) Filed: Dec. 22, 2003

(65) Prior Publication Data

US 2005/0137890 A1 Jun. 23, 2005

(51) Int. Cl.
*G06Q 99/00* (2006.01)

(52) U.S. Cl. .................................. 705/325
(58) Field of Classification Search ............. 705/1
See application file for complete search history.

(56) References Cited

U.S. PATENT DOCUMENTS

| | | | |
|---|---|---|---|
| 4,247,759 A | 1/1981 | Yuris et al. | |
| 4,298,793 A | 11/1981 | Melis et al. | |
| 4,449,186 A | 5/1984 | Kelly et al. | |
| 4,711,994 A | 12/1987 | Greenberg | |
| 4,794,530 A | 12/1988 | Yukiura et al. | |
| 4,797,542 A | 1/1989 | Hara | |
| 4,818,854 A | 4/1989 | Davies et al. | |
| 4,896,209 A | 1/1990 | Matsuzaki et al. | |
| 4,931,932 A | 6/1990 | Dalnekoff et al. | |
| 4,984,156 A | 1/1991 | Mekata | |
| 5,051,565 A | 9/1991 | Wolfram | |
| 5,066,853 A | 11/1991 | Brisson | |
| 5,144,680 A | 9/1992 | Kobayashi et al. | |
| 5,151,692 A | 9/1992 | Hirahara | |
| 5,225,990 A | 7/1993 | Bunce et al. | |
| 5,237,499 A | 8/1993 | Garback | |
| 5,247,160 A | 9/1993 | Zicker | |
| 5,253,166 A | 10/1993 | Dettelbach et al. | |
| 5,401,944 A | 3/1995 | Bravman et al. | |
| 5,457,747 A | 10/1995 | Drexler et al. | |
| 5,504,321 A | 4/1996 | Sheldon | |
| 5,680,460 A | 10/1997 | Tomko et al. | |
| 5,724,520 A | 3/1998 | Goheen | |
| 5,793,639 A | 8/1998 | Yamazaki | |
| 5,869,822 A | 2/1999 | Meadows, II et al. | |
| 5,883,575 A | 3/1999 | Ruby et al. | |
| 5,912,981 A * | 6/1999 | Hansmire et al. | 382/116 |

(Continued)

*Primary Examiner*—Jamisue A Plucinski
(74) *Attorney, Agent, or Firm*—Mark Levy; Hinman, Howard & Kattell; Lawrence R. Fraley

(57) ABSTRACT

A system and method for identifying and controlling the movement of various items, e.g., suitcases, associated with respective ones of various individuals, e.g., those desiring to travel on a selected means of transportation such as an airline, railway or the like. The system includes a plurality of programmable fingerprint readers each associated with a respective one of the items, a fingerprint scanner for scanning fingerprints from each individual and associating it with one or more of the items, a CPU for receiving readings from each of the item fingerprint readers and information from the scanner, and a retrieving unit (e.g., such as one owned by the transporting party) which retrieves selected ones of the fingerprint readings stored by the CPU for comparing with also retrieved readings from the respective fingerprint readers when the traveling individual presents an item to the transporting party for travel.

10 Claims, 3 Drawing Sheets

U.S. PATENT DOCUMENTS

| | | |
|---|---|---|
| 6,044,353 A | 3/2000 | Pugliese, III |
| 6,069,969 A | 5/2000 | Keagy et al. |
| 6,108,636 A * | 8/2000 | Yap et al. .................. 705/5 |
| 6,149,056 A | 11/2000 | Stinson et al. |
| 6,219,439 B1 | 4/2001 | Burger |
| 6,263,090 B1 | 7/2001 | Scott et al. |
| 6,325,285 B1 | 12/2001 | Baratelli |
| 6,334,575 B1 | 1/2002 | Su-Hui |
| 6,389,151 B1 | 5/2002 | Carr et al. |
| 6,518,881 B2 | 2/2003 | Monroe |
| 6,547,130 B1 | 4/2003 | Shen |
| 6,994,250 B2 * | 2/2006 | Al Amri .................. 235/375 |
| 2002/0134836 A1 * | 9/2002 | Cash et al. ............... 235/385 |
| 2003/0127511 A1 * | 7/2003 | Kelly et al. .............. 235/380 |
| 2003/0149343 A1 * | 8/2003 | Siegel et al. ............. 600/300 |
| 2004/0190757 A1 * | 9/2004 | Murphy et al. .......... 382/115 |

* cited by examiner

ITEM IDENTIFICATION CONTROL METHOD

TECHNICAL FIELD

The invention relates to the identification and control of movable items such as airplane luggage or the like so as to assure proper, safe and secure movement thereof.

BACKGROUND OF THE INVENTION

In today's environment, security consciousness with respect to travel is at an all-time high. Several additional security measures have been implemented in recent months with respect to airline and other travel in order to assure optimum safety for the traveling public. As part of same, extensive efforts are currently being undertaken to correctly identify traveling passengers and their accompanying items such as luggage, carry-ons, etc., in order to assure that security breaches will not occur; specifically, that the correct passenger will travel with the correct item and that the latter will properly arrive at the same destination as its rightful owner. Further, such measures are also intended to assure that inappropriate items are not entered into the system that might cause harm to others.

Examples of various traveler security, luggage, and ticketing systems known today are defined in the following U.S. Letters Patents:

| | |
|---|---|
| 4,247,759 | Nora et al |
| 4,449,186 | Kelly et al |
| 4,711,994 | Greenberg |
| 4,794,530 | Yukiura et al |
| 4,818,854 | Davies et al |
| 4,931,932 | Dalnekoff et al |
| 4,984,156 | Mekata |
| 5,051,565 | Wolfram |
| 5,066,853 | Brisson |
| 5,151,692 | Hirahara |
| 5,225,990 | Bunce et al |
| 5,253,166 | Dettelbach et al |
| 5,401,944 | Bravman et al |
| 5,724,520 | Goheen |
| 5,793,639 | Yamazaki |
| 6,044,353 | Pugliese, III |

The above patents describe means for identifying persons according to various input information, including information from credit cards, driver's licenses, visas, etc., that the customer/traveler provides the airline or other commuter such as when he or she purchases a ticket prior to embarking.

Other means for identifying persons, including for possible travel, are identified in the following U.S. Patents:

| | |
|---|---|
| 4,298,793 | Melis et al |
| 4,797,542 | Hara |
| 5,144,680 | Kobayashi et al |
| 5,457,747 | Drexler et al |
| 5,504,321 | Sheldon |
| 5,680,460 | Tomko et al |
| 5,869,822 | Meadows, II et al |
| 5,883,575 | Ruby et al |
| 6,069,969 | Keagy et al |
| 6,149,056 | Stinson et al |
| 6,219,439 B1 | Burger |
| 6,263,090 B1 | Scott et al |
| 6,325,285 B1 | Baratelli |
| 6,334,575 B1 | Su-Hui |
| 6,389,151 B1 | Carr et al |
| 6,547,130 B1 | Shen |

As described in some of the above patents, fingerprint (biometric) identification is known and some patents mention the use of cards such as those the size of credit cards used today for containing such information. Thus, biometric authentication is known as an acceptable means of identifying persons for various reasons.

According to the teachings of the present invention, there is provided a system in which biometric identification is utilized to correctly associate a certain item such as a piece of luggage with a certain individual who then plans to travel with such an item. The information obtained from the individual's fingerprint is also provided a central processing unit which the party responsible for the transportation, e.g., an airline, can readily access and thus link (compare) to the respective item or items the individual desires to travel with. Failure to link both traveler and item will result in refusal of one or both to enter the party's transportation system.

It is believed that such a system would constitute a significant advance in the art of travel and especially represent a significant enhancement in safety and security necessary today for such travel.

OBJECTS AND SUMMARY OF THE INVENTION

It is, therefore, a primary object of the present invention to enhance the art of proper identification and control of the movement of items and their respective owners so as to assure optimal safety for the owners during periods of such travel when said items are involved.

It is a second object of the invention to provide a system which can be readily operated by parties responsible for transporting personnel, e.g., airlines and other carriers.

It is still another object of the invention to provide such a system which is not complex to operate or relatively expensive such that use thereof can be readily and quickly implemented.

According to one aspect of the invention there is provided a system for identifying and controlling movement of various items associated with respective ones of various individuals, the system comprising a plurality of programmable fingerprint readers, each of the programmable fingerprint readers adapted for being secured to a certain one of the items and for having an individual's fingerprint recorded therein to associate the individual with the certain item, a fingerprint scanner adapted for reading individual fingerprints and for providing readings of the fingerprints to the plurality of programmable fingerprint readers and a central processing unit, including providing the individual fingerprints associated with respective ones of the certain items, a central processing unit adapted for receiving the readings of the fingerprints from the plurality of programmable fingerprint readers and for storing the readings, including the individual fingerprints associated the respective ones of the certain items, and a retrieving unit adapted for retrieving selected ones of the received and stored fingerprint readings from the central processing unit and from the plurality of programmable fingerprint readers and for comparing the retrieval readings to ascertain whether respective ones of the certain items are properly associated with the correct one of the individuals to thereby allow the properly associated items to move from one location to another.

According to another aspect of the invention, there is provided a method for identifying and controlling movement of various items associated with respective ones of various individuals, the method comprising providing a plurality of programmable fingerprint readers, each of the programmable fingerprint readers secured to a certain one of the items, and recording an individual's fingerprint therein to associate the individual with the certain item, reading individual fingerprints and providing the readings to the plurality of programmable fingerprint readers and a central processing unit, including providing the individual fingerprints associated with respective ones of the certain items, receiving the readings of the fingerprints from the plurality of programmable fingerprint readers and storing the readings, including the individual fingerprints associated with the respective ones of the certain items, retrieving selected ones of the received and stored fingerprint readings from the central processing unit and from the plurality of programmable fingerprint readers, and comparing the retrieved readings to ascertain whether respective ones of the certain items are properly associated with the correct one of the individuals to thereby allow the properly associated items to move from one location to another.

BEST MODE FOR CARRYING OUT THE INVENTION

For a better understanding of the present invention, together with other and further objects, advantages and capabilities thereof, reference is made to the following disclosure and appended claims in connection with the above-described drawings. It is understood that like numerals will be used to indicate like elements from FIG. to FIG.

Figure 1:
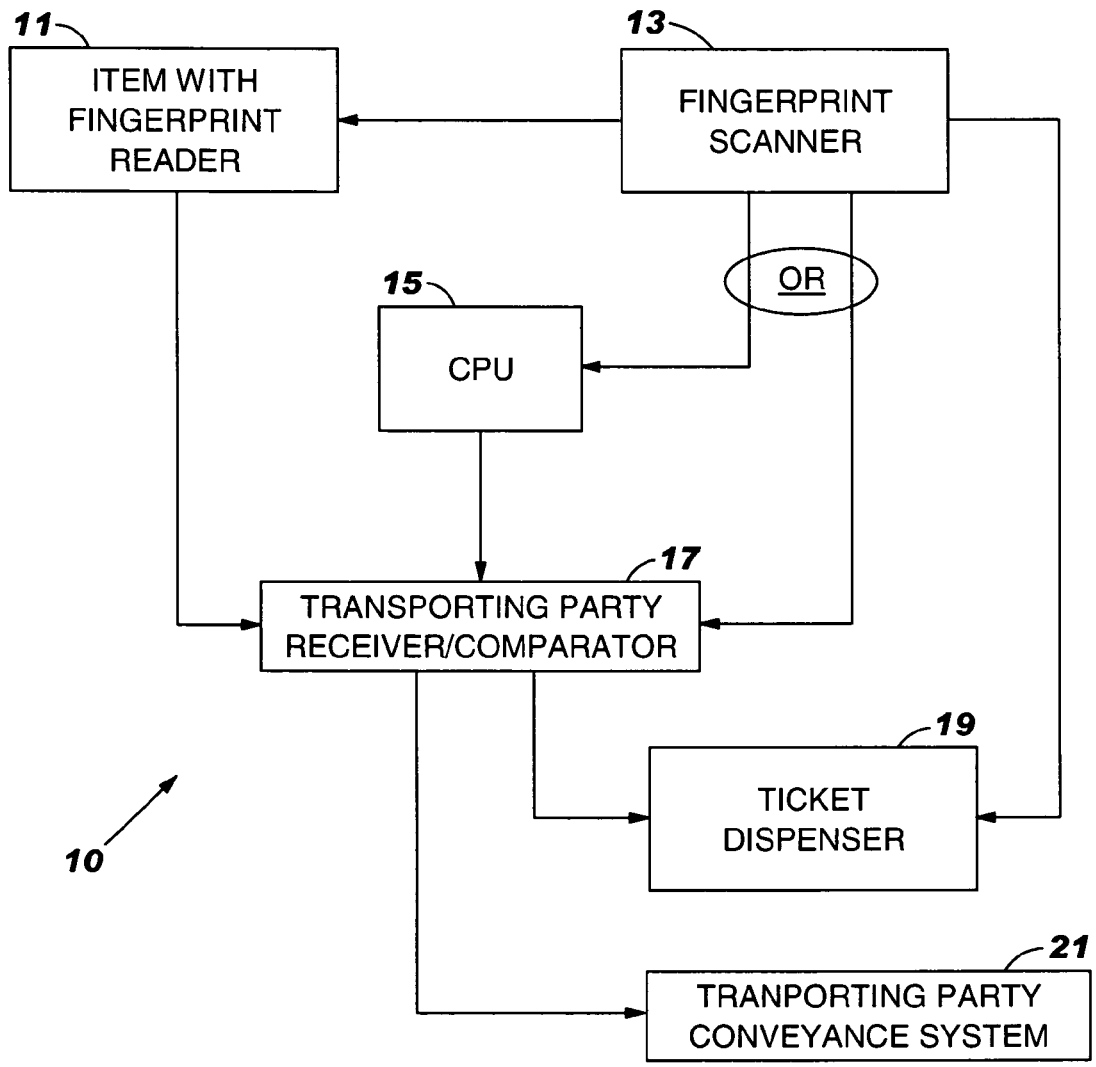
FIG. 1 is a flow diagram illustrating one embodiment of the invention.

In FIG. 1, there are shown the various elements, including optional additional elements, of a system 10 for identifying and controlling the movement of various items in accordance with one embodiment of the invention. As understood, this system both identifies and subsequently controls movement of these items, as these items are associated with respective ones of various individuals such as airline or other traveling persons. This invention is not limited to airline travel but is applicable to other forms of transportation as well, including, e.g., rail and bus.

In its broadest sense, system 10 includes a plurality of programmable fingerprint readers 11 (only one is depicted in FIG. 1 for illustration purposes and is located within an "item" as defined in greater detail below), a fingerprinted scanner 13, a central processing unit 15 and a retrieving unit 17. Additional items which may be utilized with and form part of system 10 will be further described hereinbelow. Although the terms "fingerprint scanner" and "fingerprint reader" are used separately herein, it is understood that such capabilities (reading and scanning) may be combined within a singular unit. By the term "reading" as used herein is meant to record a person's fingerprint in electronic or other format for future usage. By the term "scanning" is meant to actually scan someone's fingerprint(s) and provide the scanned information to an acceptable receiving means such as a "reader", central processing unit (computer), etc. Clearly, it is within the scope of the invention for the scanner to also "record" the print scanned in suitable format and thus provide both functions.

As stated, a plurality of programmable fingerprint readers 11 are utilized as part of this invention. Each reader is adapted for being secured to a respective (certain) item such as a suitcase or carry-on bag of an individual traveler. Although only one such item and associated reader is shown in FIG. 1, the invention is readily adaptable (and preferably desirably used with) for use with several various items, including those of different construction, e.g., several suitcases in combination with other carry-on items such as briefcases and the like, each having a reader as part thereof. The invention is thus not limited to a system in which every item must be identical, one of the unique aspects of this invention.

In FIG. 1, a fingerprint scanner 13 (only one is necessary but additional scanners are possible) is used for scanning individual fingerprints of "unit" purchasers (prospective travelers) and providing scanned information of these fingerprints to the respective fingerprint readers secured to and forming part of the respective item. Additionally, the fingerprint scanner 13 also provides its scanned information to a central processing unit (CPU), as shown in FIG. 1.

In one example of the invention, each "item" could be a suitcase sold by a certain manufacturer and includes therein the aforementioned fingerprint reader. When a prospective traveler purchases such an item (suitcase), the selling party, e.g., a department store, will have in its possession a fingerprint scanner 13 and will scan the fingerprint of the prospective purchaser as part of the purchasing activity. This scanned information will then be sent electronically to the respective reader 11 of the suitcase(s) being purchased to thus permanently record the fingerprint and associate it for an indefinite period of time with this particular purchaser. Simultaneously, the fingerprint scanner can supply its information to a CPU, such as that of a government agency, e.g., the Federal Bureau of Investigation (FBI) or another suitable, private CPU accessible to organizations which provide travel.

CPU 15 stores the several fingerprints it receives from the scanner 13 and, as understood, from other scanners owned and controlled by other item sellers. Obviously, the purpose of the invention is to accumulate as many associated fingerprints as possible. The CPU's software may convert the incoming information to its own acceptable format, if necessary.

According to one aspect of the invention, a suitable fingerprint scanner as described herein is attainable from AuthenTEC, Inc. under the product name Trueprin@R. This particular scanner functions in the following manner. A signal generator on an internal chip applies a small radio frequency (RF) signal between the purchaser's finger and the adjacent chip. The signal is coupled to the live conductive layer of the purchaser's skin by a conductive surface (finger drive ring) positioned around the outside of the active imaging region of a sensor, which senses the RF field (between finger and chip) and mimics the shape of the conductive (live) skin layer. The sensor near the finger's ridges measures higher signals and near the finger's "valleys" measures lower signals. The scanner's pixel antenna has characteristic impedances in the teraohm range. Therefore, ultra high print impedances are used to read the antenna's voltages and drive switched data buses which form part of the scanner's internal circuitry.

As stated, a finger reader and scanner can be the same unit. A fingerprint scanner and reader system thus has two basic functions. It needs to get an image of the traveler's finger (via scanning) and it needs to record (read) the pattern of ridges and valleys in this image. Eventually, the stored (recorded) image will be "matched" (as defined below) or not "matched", as the case may be. This "matching" is thus the comparison of ridges and valleys of one fingerprint to those ridges and valleys of a fingerprint taken at a later time (see below). The scanning process thus starts when the purchaser places his/her finger on a glass plate and an image is taken. The aforementioned scanner should also have its own light source, typically an array of light emitting diodes, to illuminate the finger being scanned (and read) if both functions are possible in the same unit. The system also may generate an inverted image of the finger with darker areas representing mode reflected light (the ridges of the finger) and lighter areas representing less reflected light (the valleys between the ridges).

The preferred CPU for use in the invention is a high level computer, available from IBM, HP, DELL, etc. Information from an input device (such as devices 11 and 13) is communicated via the bus to the central processing unit (CPU) which, as is known, translates commands and runs programs. Information is stored in the CPU's memory location, called a register (registers can be thought of as the CPU's tiny scratch pad, temporarily storing instructions or data). When a computer program is run, one register called the program counter keeps track of which program instruction comes next. As is known, the CPU's control unit coordinates and times the CPU's functions, and it retrieves the next instruction from its memory. Such functional capabilities for CPU's are well known, and further description is not needed necessary.

In addition, method 10 also includes what will be referred to as a receiving and comparator unit 17 which is adapted for receiving selected ones of the several received and stored fingerprint readings from CPU 15 and, as seen, from the respective fingerprint readers and scanners when requested. Although called a "receiver/comparator" (FIG. 1), this device of the invention is preferably another CPU, having the aforementioned capabilities of CPU 15. It, however, preferably is under different control than CPU 15 (e.g., it is preferably owned and operated by the transporting party chosen to transport the purchaser of the particular item (e.g., luggage) being transported with this purchaser, now prospective traveler). Essentially, CPU 17 "retrieves" information prior to making its desired comparisons and will thus be referred to herein as a retrieving unit.

Figure 3:
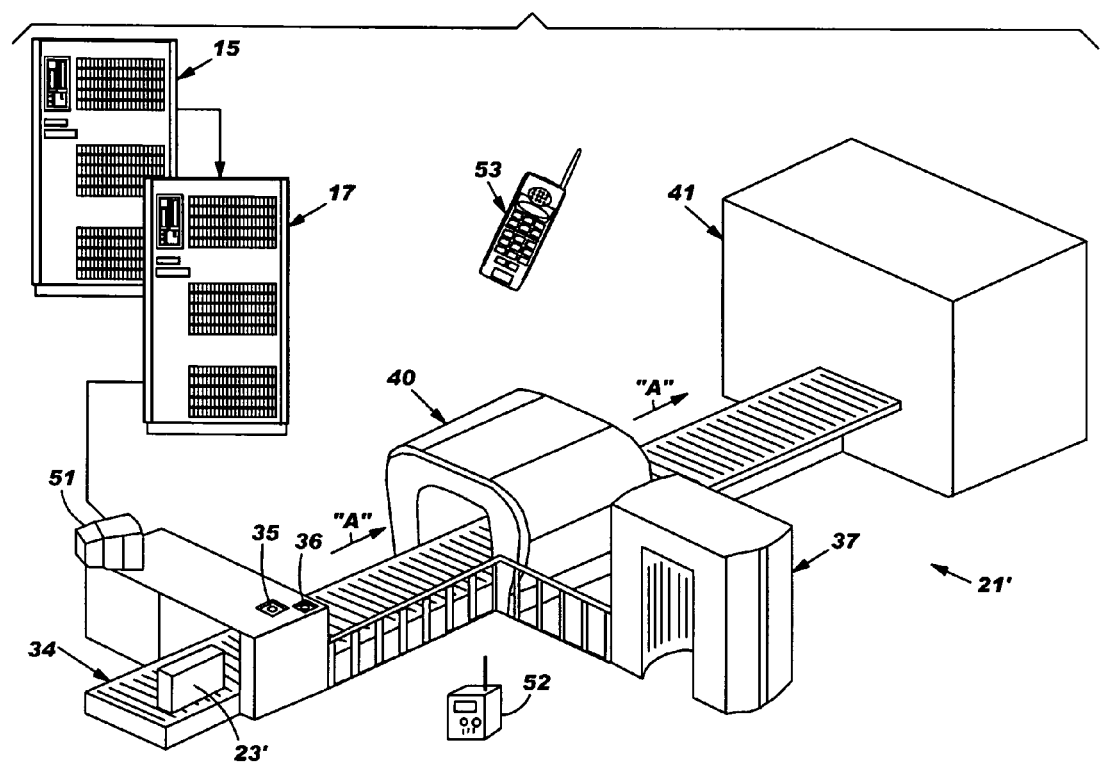
FIG. 3 is a perspective view, illustrating one example of a transporting party's conveyance system which may form part of the system of the invention and/or work in cooperation therewith.

In one example of the invention, unit 17 is preferably owned and operated by an airline, railway company, or other carrier. This transporting party, when confronted with various items for transport, can thus summon inputs from both the readers associated with these items and the CPU 15. Comparisons are then made and the transporting party is thus able to determine whether the respective item is correctly associated with the person presenting the item to the transporting party. It is understood that the transporting party will also require, as is typical today, some means of identification of the individual presenting the item, the most common probably being the photo I.D. on a driver's license, a passport, visa or the like. Once a positive comparison is achieved, the transporting party can then accept the item for transport and enter it into its respective transporting system, e.g., conveyor(s), truck(s), etc. An example is shown in FIG. 3 and will be described below. Failure to obtain a positive association between item and individual will thus trigger the transporting party to reject the attempt to transport the respective item (and allow said transporting party to perhaps warn authorities or others as to the improper association). Alternatively, should there be an error in the fingerprint reader, the transporting party may elect other means to assure itself that the respective item is truly that of the presenting individual. Such alternative measures are completely at the option of the transporting party. Presumably, the transporting party could allow the presenting individual to proceed to enter its system and place the respective item in a secure location while a private investigation is undertaken to determine the true identity of the presenting individual. This also is at the option of the transporting party.

In an alternative embodiment, the respective fingerprint scanner(s) shown in FIG. 1 could instead provide information directly to unit 17 and thus avoid CPU 15. In this embodiment, the transporting party would thus receive these fingerprint readings and compare same with the readings from the respective fingerprint readers on each of the items presented to it. This avoids the requirement for utilization of CPU 15, should it be considered sensitive to various individuals to utilize same, e.g., should the CPU be controlled by various authorities such as the aforementioned FBI or other police organizations. Security is thus assured regardless of these alternative approaches to providing the transporting party with the necessary information it needs to assure proper association between item and the individual presenting same. Although in FIG. 1 it is shown that the scanner may alternatively provide inputs to CPU 15 or unit 17, it is also within the scope of the invention that the scanner provide both such elements with this information. The choice whether to receive the fingerprint scanner's information from a CPU or the scanners themselves may depend on the functioning capability of unit 17, primarily its processing power. Should this be a cost factor for the transporting party, access to a much larger and possibly faster CPU may be necessary or at least desirable. This again is the option of the transporting party and involves issues of privacy, cost and others. The invention is designed to suit all of these possibilities.

In FIG. 1, system 10 is also shown to include a ticket dispenser 19 which, in one embodiment, can be owned by the transporting party and, when a positive association is attained, dispense a ticket to the presenting individual for subsequent travel using the transporting party's means of transportation. Such ticket dispensers are known and, in the case of the present invention, will function to dispense a hardcopy ticket to the individual at a suitable location (e.g., kiosk) that the individual can receive and utilize during his/her travel.

Additionally, system 10 may include a transporting party conveyance system 21 (defined in greater detail below) which can be owned by the transporting party and which can be activated to function when receiving the compared output from unit 17. A typical conveyance system may be a conveyor such as used by many airlines. Therefore, should no proper association occur, and the respective item possibly already within the conveyance system, the retrieving unit can stop the conveyance system and appropriate means can be taken to remove the respective item not properly associated with the individual.

Figure 2:
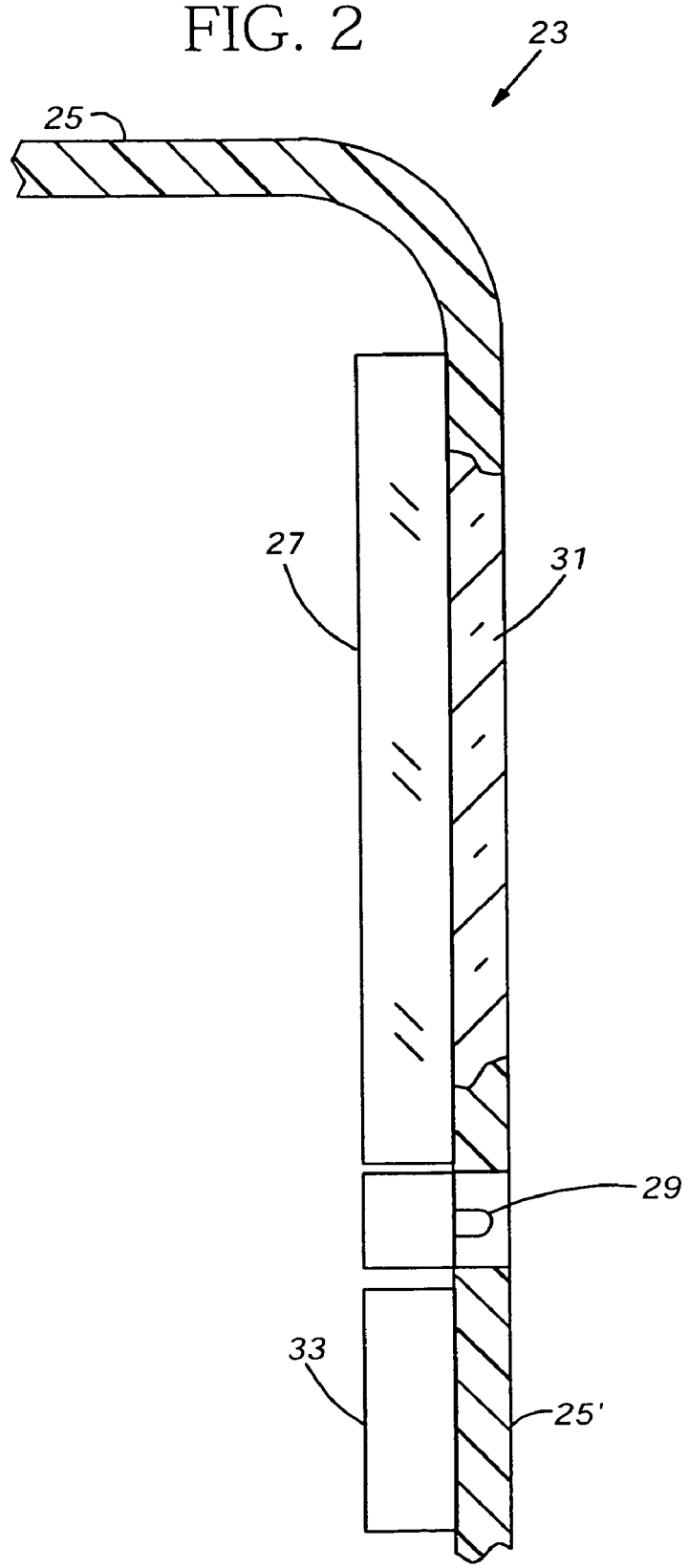
FIG. 2 is a partial side view, in section, showing an item (i.e., a person's luggage) having a fingerprint reader as part thereof.

In FIG. 2 there is seen a partial, cross-sectional view of an item 23 such as a suitcase or briefcase or the like having a pair of walls 25 and 25' as part thereof, as is typical of most suitcases and similar items for transportation. Item 23 includes the aforementioned fingerprint reader 27 secured thereto such that respective fingerprint scanner 13 may input readings thereto, e.g., using a small plug 29 or the like. Subsequent review of the recorded readings in reader 27 may be obtained through a transparent window 31 also formed within one of the walls 25 or 25', preferably adjacent the reader 27. Thus, when the individual presenting the item 23 to the transporting party does so, the transporting party needs only to utilize its receiver/comparator unit to read the respective fingerprint of item 23 and compare it to the readings from CPU 15 and/or scanner(s) 13. Alternatively, it is also possible for the receiver/comparator to be plugged into reader 27, e.g., using a plug such as 29 shown in FIG. 2. The use of a transparent window may be desired if the fingerprint is located on an external surface of reader 27 and thus is readily viewable through the window by the transporting party.

To further assure proper travel of each of the units 23 in accordance with the teachings of this invention, each unit may also include a radio frequency (RF) emitter 33, shown in FIG. 2 as attached to wall 25' adjacent reader 27. The system in FIG. 1 would thus include a suitable RF detector capable of reading signals from respective ones of the emitters 33 to assure precise location and identification thereof, if desired. For example, should a properly associated item enter the transporting party's conveyance system and somehow be misplaced, the transporting party could own one or more of the described RF frequency detectors and scan a collection of such units at an appropriate location to precisely locate it and return it to its proper path of travel and/or individual. Examples of suitable RF detectors are available from North American Philips Corporation under the product name ICOD EPC. These particular detectors operate in various frequency ranges, e.g., 135 KHz, 860-930 MHz, 2.46 GHz, etc., and operate in a manner known in the art. Similarly, RF emitters are also known and function in a manner known in the art. Such emitters are also attainable from the above company and can be readily positioned (secured to) each item to provide the function taught herein.

FIG. 3 illustrates a conveyance system 21' usable with or which forms part of the system defined herein. System 21' includes a movable conveyor 34 on which several items such as "unit" (luggage piece) 23' may be placed. The item, of course, includes the reader and possibly RF emitter described with respect to FIG. 2. In operation, a traveler will place his/her finger on a finger sensor 35. The traveler's bag(s) is also aligned with finger sensor 35 or a second sensor 36 may be utilized. The traveler lays his finger on the sensor and the sensor reads the prints. This information is fed to the CPU 17, which, if functional with CPU 15, compares this with that already established. If CPU 17 is independently operable (does not receive input from CPU 15), it compares this input to its own database; otherwise, it seeks the database information from CPU 15. If the correct identity is established, conveyor 34 starts and unit(s) 23' proceeds in direction "A" to a pair of explosive detectors 40 and 41. The first, 40, is designed for detecting solid explosive material and the other, 41, for detecting liquid explosives. Alternatively, both detectors may be combined as a single unit. Such detectors are known in the art and further description is deemed unnecessary. If unit(s) 23' clear the second (and final) solid explosive detector 41, a ticket is issued the traveler. The traveler now enters screen 37. Screen 37 may be similar to conventional screeners used presently at airports and other protected facilities designed for metal detection, explosive residue, etc., with minor modification thereto. If the unit(s) and traveler both are cleared, screen 37 asks the traveler to insert his/her ticket into a slot (not shown) in the screen structure. It again establishes final identity of the traveler and unit(s), records the data and indicates to appropriate personnel (i.e., using monitor 51) that it is permissible for the traveler to proceed.

Should a piece of luggage (unit) become misplaced in the transporting party's conveyance system, an RF detector 52 may be utilized to detect signals from the aforedescribed RF emitter 33 shown in FIG. 2. Additionally, use of a cell phone 53 or the like is possible in combination with a satellite Ground Positioning System (GPS), several of the latter known in the art, including especially those available on some motor vehicles sold today. The luggage would of course include the necessary part (e.g., chip and circuitry) of such a system, and the phone 53 would work in conjunction with the luggage's output (e.g., from a GPS "tag" attached thereto). The phone's antenna would receive tag signals and in turn precisely locate the luggage's location.

While there have been shown and described what are at present the preferred embodiments of the invention, it will be obvious to those skilled in the art that various changes and modifications may be made therein without departing from the scope of the invention as defined by the appended claims.

What is claimed is:

1. A method for identifying and controlling movement of an individual luggage item which is associated with a respective individual purchaser of said luggage item, comprising:

providing a luggage item having at least one wall and at least one stationary, programmable fingerprint reader installed during luggage construction and permanently disposed therein;

scanning, by a fingerprint reader, individual fingerprints of said individual purchasers of said luggage item at the point of sale, as part of a purchasing activity, electronically sending information regarding each of said individual purchaser fingerprints from said fingerprint scanner to said at least one programmable fingerprint reader of the luggage being purchased and permanently recording the purchaser fingerprint into the fingerprint reader, said fingerprint scanner also providing said information regarding each of said individual purchaser fingerprints to a central processing unit;

storing, by the central processing unit, said information regarding said individual purchaser fingerprints;

retrieving, by a retrieving unit, said information regarding said individual purchaser fingerprints from a central processing unit and said information regarding said individual purchaser fingerprints from said at least one programmable fingerprint reader; and comparing said information regarding said individual purchaser fingerprints from said central processing unit and said information regarding said individual purchaser fingerprints from said at least one programmable fingerprint reader to ascertain whether said luggage item is properly associated with the correct one of said particular individual purchasers of said luggage item to thereby allow said properly associated luggage item to move from one location to another.

2. The method of claim 1 wherein said fingerprint scanner further provides said information regarding said individual purchaser fingerprints from said scanning to a retrieving unit.

3. The method of claim 2 wherein said retrieving unit is further adapted for also retrieving said information regarding said individual purchaser fingerprints from said fingerprint scanner and comparing said information regarding said individual purchaser fingerprints from said fingerprint scanner with said information regarding said particular individual purchaser fingerprints from said at least one programmable fingerprint reader to further confirm the proper association of said luggage item to said correct ones of said particular individual purchasers.

4. The method of claim 2 wherein said retrieving unit is an airline CPU and said method further includes providing an airline ticket dispensing unit for receiving inputs from said airline CPU and for dispensing an airline ticket to one of said particular individual purchasers when said particular individual purchaser is properly associated with said luggage item and said luggage item is cleared through a scanner.

5. The method of claim 1 further including providing a ticket dispensing unit adapted for receiving input from a retrieving unit and for dispensing a ticket to one of said particular individual purchasers properly associated with said luggage item.

6. The method of claim 1 further including a radio frequency identification system comprising a plurality of radio frequency emitters permanently secured to said at least one wall of said luggage item and at least one radio frequency detector for scanning signals emitted by said plurality of radio frequency emitters through said wall of said luggage item to precisely locate and identify said luggage item at one of said locations or somewhere between said locations.

7. The method of claim 6 wherein said radio frequency emitter comprises at least one of the group: cell phone and GPS device.

8. The method of claim 1 further including providing a conveyor transport system for moving said properly associated items from said one location to said another location after positive identification is established between the traveler and the baggage thereof.

9. The method of claim 8 wherein said conveyor transport system is an airline conveyor transport system.

10. The method of claim 1 wherein said central processing unit is a law enforcement agency central processing unit.

* * * * *